UNITED STATES PATENT OFFICE.

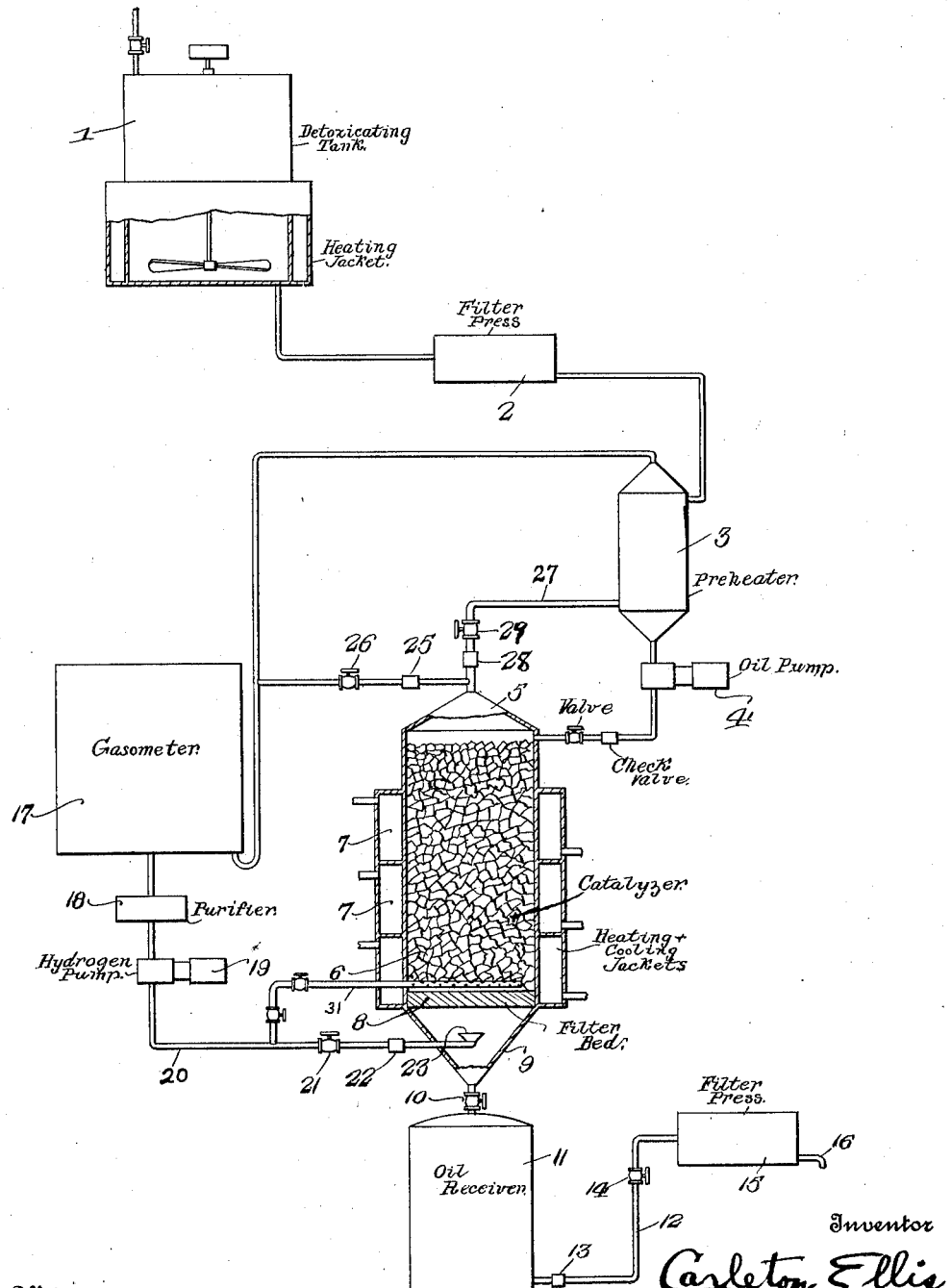

CARLETON ELLIS, OF MONTCLAIR, NEW JERSEY.

PROCESS FOR TREATING FATTY OILS.

1,343,255.  Specification of Letters Patent.  Patented June 15, 1920.

Application filed December 17, 1915. Serial No. 67,452.

*To all whom it may concern:*

Be it known that I, CARLETON ELLIS, a citizen of the United States, and a resident of Montclair, in the county of Essex and State of New Jersey, have invented certain new and useful Improvements in Processes for Treating Fatty Oils, of which the following is a specification.

This invention relates to a method of hydrogenating fatty oils and other unsaturated material and relates particularly to a continuous process of hydrogenation involving the use of hydrogen under pressure, in the preferred form affording very desirable hydrogenated products free from catalytic metal.

This application is derived in part from matter disclosed but not claimed in my copending application, Serial No. 686,988, filed March 29, 1912, and in my prior application, Serial No. 656,100, now Patent No. 1,026,156, issued May 14, 1912, especially as regards the continuous hydrogenation of fatty oils employing hydrogen under pressure. This application further contains matter derived from Serial No. 39,620, filed July 13, 1915, for the reduction of nickel or other catalyzer with compressed reducing gas.

One method of hydrogenating fatty oils which is now quite extensively practised is to add to the oil about one per cent. of very fine nickel catalyzer and bubble hydrogen through the oil mixture at a temperature of about 180° C. and sometimes, especially when the catalyzer is very heavy, or is incorporated with heavier carriers such as fragments of pumice or the like, to mechanically agitate the oil in order to better aid the suspension of the catalyzer. No substantial gas pressure of hydrogen is required in this case. The treatment is kept up for a period of six to ten hours for the production of what is known as hard fat, that is, hardened oil having a melting point of over 50° C., such for example as is used largely in the manufacture of lard compound. This long treatment of the oil at a fairly high temperature causes, in some cases, certain changes affecting the chemical composition of the oil as well as the odor and flavor. A certain amount of unsaponifiable matter forms, due apparently to the reduction of the carboxyl group. The hydroxyl groups in hydroxylated fats are reduced more or less thus changing the character of the fat to some extent and giving rise to the formation of water which tends to have a bad effect on the catalyzer. In some cases it is possible to use a larger amount of catalyzer and thus shorten the time of operation. The addition of too large a quantity of catalyzer gives trouble in the subsequent operation of filtration so that approximately one-half to one per cent. of nickel is generally used and this oftentimes is associated with a carrier such as pumice or kieselguhr. By the present method protracted contact of the oil with catalyzer at high temperatures may be avoided and the oil brought into brief or even almost momentary contact with what may be termed a great excess of catalytic material so that a unit mass of oil contacts at any given moment with a considerable mass even as high as its own weight of catalytic material as contrasted with the operation described above in which case the oil contacts with only about one hundredth part or less of catalytic agent. Thus in the present invention the oil may be exposed to a relatively great excess of catalytic material under conditions tending to cause rapid hydrogenation. In order to have the catalyzer sufficiently active it is necessary to supply hydrogen at such a rapid rate that the catalyzer is always charged with hydrogen or has available an abundance of hydrogen to draw from for the purpose of delivering the requisite quantity of nascent hydrogen to the oil. In supplying hydrogen under ordinary atmospheric pressure, such excess of hydrogen is not easy to obtain. Under ordinary atmospheric pressure the oil does not absorb hydrogen advantageously especially at the high temperature employed but by employing hydrogen under substantial pressure, that is to say, from ten to twenty-five pounds or even up to ten to fifty atmospheres or more the oil becomes charged with hydrogen which apparently dissolves much more freely in the oil when the hydrogen is compressed and thus the oil dissolves hydrogen and delivers the latter to the catalyzer which in turn brings about the combination of the hydrogen with the oil. The presence of a relatively enormous mass of catalyzer in contact with oil saturated by hydrogen merely dissolved under pressure enables hydrogenation to take place at a lower temperature than 180° C., and this enables in turn a larger quantity of hydrogen to be dissolved in the relatively cool oil. A temperature of from 90° or 100° and upward is preferably employed and from 100 to 135° affords satisfactory results depending on the pressure employed.

The addition of hydrogen is so rapid under these conditions that heat is evolved when operating on the large scale making it necessary to cool the oil. This may be done either by providing a radiating surface or by having water jackets or cooling tubes through which a cooling medium is supplied so as to regulate the temperature at the desired point at which hydrogenation takes place rapidly and effectively without any substantial undesirable or objectionable decomposition thus precluding the occurrence of various side reactions which form objectionable by-products.

The successful operation of the continuous process of hydrogenating oils also depends on the care with which the oils are freed from catalyzer poisons. Most animal and vegetable oils contain small amounts of sulfur which are given up to the catalyzer and gradually retard its action until finally the speed of catalysis is too slight to be operative. To overcome this difficulty the oil may be treated with a detoxicating compound. Specific compounds for this purpose are copper hydrate and silver hydrate or oxid. In hardening edible oils the silver compound is more desirable, while for technical fats the copper compound is satisfactory. Freshly precipitated hydrate is to be preferred and the temperature of treatment is usually about 120° C. The oil may be agitated with a few per cent. of this material or a continuous method of detoxication may be used in that the detoxicating material such as copper or silver compound or other similar body is placed in a tube or tower and the oil allowed to flow through it while maintaining the requisite temperature. The detoxicating material may be supported on lumps of pumice, charcoal or other suitable supporting material. It is desirable to admit a small amount of hydrogen into the detoxicating section in order to maintain conditions which are substantially reducing or at least to aid in the expulsion of the air or oxygen from the oil. It is not necessary to have the hydrogen under pressure however. Copper hydrate in a freshly precipitated form removes the toxic sulfur compounds with great ease, while ignited copper oxid is ordinarily of little or no value.

If the oil is not sufficiently preheated by passage through the detoxicating apparatus or in case the latter is not used the oil may be passed through a preheating chamber and may be advantageously blown to a slight extent with hydrogen gas to eliminate air or gaseous impurities effecting the catalyzer deleteriously in the subsequent operation of hydrogenating. The oil may be preheated to 100 or 125° C. or even higher, depending on the temperature desired in the hydrogenating chamber, especially in the early stages of hydrogenating before such amount of heat is developed that the oil would become overheated. In the latter event cooling is required.

The catalyzer employed is preferably nickel or mixtures of nickel and copper with or without the presence of their oxids or suboxids. Other metals including iron, cobalt and also the rare metals may likewise be employed but specifically nickel is the primary or base material preferably employed herein as the catalytic agent in an illustrative sense.

In order to render the flow of oil through the catalytic mass rapid and free the catalytic material is preferably mounted on a supporting material which may be of a mineral character such as fragments of pumice, masses of kieselguhr, unglazed clay marbles or other forms of broken pottery such as porcelain, also asbestos and the like. Or a hydrogen absorbing and occluding agent such as charcoal in the form of coarse fragments or granules may be used. The size of the fragments also regulates the rate of flow and the fragments may range from quite fine particles capable of forming a pervious filter bed to coarser granules the size of wheat or larger lumps the size of marbles, etc.

The catalyzer may be placed in baskets as described in Patent No. 1,040,531 of Oct. 8, 1912. It may be reduced in a separate reducing furnace and flooded with oil to keep the particles from the air so that they may be introduced into the hydrogenating chamber without detriment to its activity because of oxidation or the catalyzer may be reduced in the hydrogenating tube or chamber, in which case it is desirable to use such a high pressure of hydrogen that the catalyzer is thoroughly reduced to the metallic state without loss of sensitiveness due to overheating. Pressures of several atmospheres of hydrogen gas may be thus used.

In the hydrogenation of fats, particularly those containing some fatty acid, complaint has arisen because the catalyzer may dissolve to some extent in the oil during the treating process. Even small amounts of nickel in an edible fat are regarded as highly objectionable from the hygienic standpoint and in the case of larger amounts of nickel or copper in fats used for white toilet soaps discoloration is said to take place in some cases because of the presence of these metallic compounds. The tendency of a catalyzer of say the nickel type to go into solution in the oil is to a considerable degree dependent upon the hydrogen pressure with respect to the temperature, etc. Should nickel dissolve in the oil to form a nickel soap in the early stages of the treating process, when such soap comes in contact with heated hydrogen under pressure the nickel compound is reduced yielding the metal which may be collected on a filter bed forming a part of the apparatus so that the hardened oil may be withdrawn from the apparatus free or practically free from nickel material.

One the other hand when using finely-divided nickel catalyzer suspended in the oil in the agitation process first mentioned above it is customary to slowly filter press the oil to remove the suspended finely-divided catalyzer. This operation takes place usually in the absence of hydrogen and at a relatively low temperature under conditions which make possible the ready solution of nickel in the oil. Hence a nickel charged product is obtained by such procedure while the tendency in the present process of conducting the operation is to produce a nickel-free product. Such a desirable result is not readily obtained when using hydrogen at ordinary atmospheric pressure without such an elevation of temperature as would tend to affect the quality of the oil. By increasing the pressure from ten to twenty-five pounds, or higher, a definite control over the condition of the catalytic material may be maintained to the desired degree. Of course, there is no objection to higher pressure of gas such as fifty or one hundred pounds or even twenty-five or fifty atmospheres or so. Increase of the hydrogen pressure by ten or twenty-five pounds or approximately one or two atmospheres pressure above atmospheric is however usually adequate to effect the results described herein. In case the catalyzer bed employed does not hold back the finely-divided nickel formed in the oil or in case the latter is of too colloidal a nature, filter pressing may be resorted to but in such cases it is desirable to have hydrogen present during the filtration operation and it is preferable to keep the oil at a temperature at which the hydrogen exerts the desired complete reducing action on the nickel method preventing it from remaining in solution or of dissolving in the oil during the filtration process, and for example according to the procedure described in my co-pending application Serial No. 817,041, filed February 6, 1914.

Oils containing free fatty acid usually are highly detrimental to nickel catalyzer and many oils such as the marine animal oils not only contain toxic bodies but free fatty acid. This free fatty acid may be neutralized by treatment with glycerin to form glycerids or by heating with methyl or ethyl alcohol forming the methyl or ethyl ester of the fatty acid. This esterification is facilitated by the addition of one or two per cent. of concentrated hydrochloric acid. When esterification is sufficiently complete, the oil is washed to remove the mineral acid and is then ready to be detoxicated or hydrogenated as the case may be. For example, a cod oil containing catalyzer poisons and containing about ten per cent. of free oleic acid and which could not be hardened in the usual way was heated with wood alcohol in the presence of one per cent. of hydrochloric acid when the amount of whole free acid was reduced to about one per cent. The product was detoxicated with copper hydrate and could then be readily hydrogenated to a hard product by means of nickel catalyzer.

An apparatus for carrying out the process of my present invention is shown in the annexed drawing, in which the oil may be detoxicated in tank 1, passed through filter press 2, preheater 3, which may also contain a detoxicating agent, whence it is pumped by pump 4, at any desired pressure into the reaction vessel 5, containing catalytic material 6, for example a catalytic metal deposited upon a suitable support. The vessel 5 may be provided with a suitable temperature regulating jacket 7, for heating or cooling, or for heating at one stage of the process and cooling at another stage. The several parts of this jacket may be separately operated, and may contain fluids at different temperatures, if so desired.

The product may be drawn through a filter bed 8, into the compartment 9, thence through valved passage 10 into receptacle 11, and thence through pipe 12 provided with reducing valve 13, and shut off valve 14, and through a filter press 15, to exit 16.

Hydrogen from the gasometer 17, which may be of the ordinary floating type, is led through purifier 18, by pump 19, thence through pipe 20, provided with a valve 21 and a check valve 22, to the rose 23. This passes upward, through filter 8, which acts as a spreader for the hydrogen. As an alternative, a part or all of the hydrogen may be introduced above the filter bed 8, by the pipe 31, provided with a valve and check valve. In which case, the hydrogen passes through the oil while in contact with the catalyzer 6, and a part of the unabsorbed hydrogen may pass the check valve 25, valve 26, back to the gasometer 17. Another part of the same may pass through pipe 27, past reducing and check valve 28, through the oil in preheater 3 and back to 17.

Suitable valves will be provided wherever necessary.

It will be understood that this is only one of the many forms of apparatus which may be employed for carrying out the process of my present invention.

The detoxication of oil, by the method herein described, but not in combination with the step of passing the oil through a bed of catalyst, and not in combination with the removal of the heat produced in the reaction, but in combination with the step of hydrogenation broadly, is claimed in my copending application 14,524 filed Mar. 15, 1915.

What I claim is:—

1. The process of hardening oils of a fatty nature containing unsaturated components, which comprises bringing the oil into contact with a stationary catalytic agent containing an amount of active catalytic substance materially greater than one per cent. of the weight of oil which would be in contact with the catalyzer at any given time, in the presence of a counter current of hydrogen while maintaining such a pressure and temperature that no material amount of the metal of the said catalyzer can remain combined with fatty acid contained in said oil and in cooling the oily material below the point where objectionable side reactions occur.

2. The process of hardening oils which comprises heating the oil to the reaction point, passing through a bed of catalyzer in the presence of a counter current of hydrogen-containing gas; whereby a reaction takes place with the evolution of heat, and in cooling the oily material after the reaction has started sufficiently to maintain the temperature at the reaction point, and above that at which the catalytic metal would remain in solution.

3. The process of hardening oils which comprises heating the oil to the reaction point, passing the same through a bed of catalyzer in the presence of hydrogen gas; whereby reaction takes place with the evolution of heat and in cooling the oily material after the reaction has started so as to maintain the temperature at the reaction point while in the catalytic zone, and above that at which the catalytic metal would remain in solution.

4. The process of hardening oils which comprises heating the oil to the reaction point, passing it through a bed of catalyzer containing an amount of active catalytic substance materially greater than one per cent. of the weight of oil which would be in contact with the catalyzer at any given time, in the presence of a counter current of hydrogen gas; whereby reaction takes place with the evolution of heat and in cooling the oily material to maintain the temperature at the reaction point while in the catalytic zone.

5. The process of hardening oils which comprises passing a current of oil as a solid stream through a column of nickel catalytic material containing an amount of active catalytic substance materially greater than one per cent. of the weight of oil which would be in contact with the catalyzer at any given time, in passing hydrogen under pressure as a counter current through the oil, in removing from the unabsorbed hydrogen gas the moisture and objectionable products of decomposition derived from the oil, and in introducing the residual purified hydrogen gas again into the oil and through catalytic mass.

6. In the hydrogenation of fatty oils, the step of filtering the oil in the presence of hydrogen and catalytic metal, while at a temperature above that at which compounds of the catalytic metal with the fatty acid of the oil could remain undecomposed in the oil.

CARLETON ELLIS.